US005639340A

United States Patent [19]

Volk

[11] Patent Number: 5,639,340

[45] Date of Patent: Jun. 17, 1997

[54] PORTABLE HAND-HELD LABELLING AND MARKING DEVICE AND PRINTING MECHANISM THEREFOR

[75] Inventor: Heinrich Volk, Beerfelden, Germany

[73] Assignee: Esselte Meto International GmbH, Heppenheim, Germany

[21] Appl. No.: 401,012

[22] Filed: Mar. 9, 1995

[30] Foreign Application Priority Data

Mar. 12, 1994 [DE] Germany .......................... 44 08 460.9

[51] Int. Cl.[6] .......................... B32B 31/00

[52] U.S. Cl. .......................... 156/579; 156/577; 156/387; 156/541

[58] Field of Search .......................... 156/579, 574, 156/577, 523, 387, 540, 541, 542

[56] References Cited

U.S. PATENT DOCUMENTS 5,258,090 11/1993 Becker et al. .......................... 156/540 X

FOREIGN PATENT DOCUMENTS 2624796 6/1989 France .
7004663 6/1970 Germany .
2421697 11/1974 Germany .
2438989 3/1976 Germany .
2537010 5/1976 Germany .
2556211 6/1977 Germany .
3140982 5/1983 Germany .

*Primary Examiner*—James Engel
*Attorney, Agent, or Firm*—Nils H. Ljungman and Associates

[57] ABSTRACT

A portable hand-held labelling device can generally have a printing mechanism, which in the case of an embodiment with printing belts and print-side guide wheels, can have the guide wheels rotationally mounted on a shaft which is fixed to the housing. The shaft can be fabricated as a single piece with the housing or a part of the housing, and the free end of the shaft can be centered and laterally fixed in a blind locator in another part of the housing. The shaft can be provided with a longitudinal groove into which a locking strip with a number of guide channels for locking elements, corresponding to the number of guide wheels, can be inserted, and in particular, inserted and locked into place. The locking elements are preferably components of a locking mechanism, which locking mechanism also includes locking locators in the bearing hole of each guide wheel, which locking locators interact with the locking elements to rotationally position the guide wheels on the shaft. The number of locking locators determines the number of defined rotational positions of each guide wheel.

20 Claims, 4 Drawing Sheets

PORTABLE HAND-HELD LABELLING AND MARKING DEVICE AND PRINTING MECHANISM THEREFOR

BACKGROUND OF THE INVENTION

1. Field of the Invention

The present invention generally relates to hand-held labelling and marking devices for printing information such as prices, etc. on a label material, or alternately directly onto an article. Such devices are most often used in grocery and retail stores for pricing goods and/or labelling goods with an identification number, etc. Such devices for labelling and marking can have a printing mechanism with a number of print wheels or printing belts for carrying the print type. In the case where print wheels are used, the print wheels can preferably be coaxially mounted, whereas, when belts are used, the belts are guided around multiple, coaxial printing area-side guide wheels, or printing-type wheels, of the labelling device. The print wheels, or guide wheels are typically rotationally mounted on a shaft, which shaft is fixed to the housing. In addition, the wheels can also preferably be releasably held in specified rotational positions on the shaft by means of a locking mechanism.

In each specified locking position, the numbers, letters, symbols etc. of all the print wheels and/or printing belts should preferably form exactly one row of print type. The locking mechanism for providing such an alignment can be formed by a number of spring-loaded locking elements, wherein the number of spring loaded locking elements can essentially correspond to the number of print wheels or guide wheels. The locking mechanism can also generally include several locking locators disposed on each of the guide wheels, which locking locators interact with the locking elements. The locking locators are preferably evenly distributed about the bearing hole of the print wheels or guide wheels.

2. Background Information

By means of an adjustment shaft which can be moved axially, and which rotates a printing belt, or print wheel, each print wheel or printing belt can be set, one after the other, with respect to its adjacent wheel or printing belt. Thus, upon completion of an adjustment process for a respective setting of print type, those printing symbols which are to be used to print a label or similar item are in one row. The locking mechanism mentioned above preferably ensures that all of the symbols in the impression form a properly configured row of symbols.

The locking mechanism can also ensure the correct orientation of each symbol with respect to its neighboring symbols for each setting of each print wheel or printing belt. That means that each locking locator of each print wheel, or print-area side guide wheel, essentially must be correctly oriented with respect to the symbols of its print wheel, or the teeth of its guide wheel when viewed circumferentially.

Thus, in the case where printing belts are used, the belts can be designed internally in the form of toothed belts, with the guide wheels forming the associated toothed gears. Also, in the case where print wheels are used, the number of locking locators on the print wheel, for example, can correspond to the number of print symbols on the respective print wheel. By providing a correspondence between locking locators and print symbols, for example, the middle of a toothed symbol carrier can be precisely oriented with the middle of a locking locator. The same applies to the guide wheels in the case of printing belts, but other arrangements are also possible. With printing belts, in particular, one can choose the number of locking locators to be less than the number of teeth on the guide wheels, whereby the number of teeth is preferably a whole multiple of the number of locking locators of the respective wheel. If there are eight teeth, for example, there can be four locking locators at intervals of about 90 degrees. In general, the number of locking locators can essentially be a function of the size of the symbols, seen in the circumferential direction of the belts.

When turning the print wheels or guide wheels on the shaft which is fixed to the housing, which turning in a belt printing mechanism can be accomplished by means of the respective printing belt, the locking element must move radially inward against the resistance of its load spring until the desired rotational orientation of this wheel is reached. At the proper rotational orientation the locking element can be engaged in the associated locking locator.

In a known embodiment of such a printing mechanism, German Patent Publication Published for Opposition Purposes No. 25 37 010, discloses that the locking elements are realized in the form of over-mounted pistons, the inner ends of which are braced against a common flexible strip.

For assembly reasons, each locking element is secured on the shaft against unintentional removal from its locator. This is provided by fixing each locking element to the housing by means of two opposing locking teeth which are engaged in corresponding recesses in the locking element. The engagement of the locking teeth with their locating shaft is accomplished by means of a radial pressure with corresponding elastic guide motions. The barb-like shape of the locking teeth of the shaft which is fixed to the housing prevents the release of this snap-in connection. However, as a result of this coupling of the locking elements with the shaft which is fixed to the housing, the locking elements project at various distances from the shaft so that they are engaged at different depths in the locking locators of the associated wheels. Because of the trapezoidal shape of both the locking locators and the engaging end of the locking elements, engagement at different depths results in a different rotational orientation, which can be reflected by an incorrect row of symbols.

OBJECT OF THE INVENTION

It is therefore the object of the current invention to refine a printing mechanism of the type described above so that the printing mechanism essentially guarantees that the print wheels or the print-area side guide wheels are properly locked, free of play, for each printing mechanism setting.

SUMMARY OF THE INVENTION

To achieve this object, the present invention teaches that the shaft, which shaft is preferably fixed to the housing of a printing mechanism of the type described above, can be equipped with a longitudinal slot into which a locking strip with the locking elements can be inserted. For each locking element, the locking strip preferably has one guide channel which is tapered at its outer end, and the locking elements are preferably disposed within the guide channels. The portion of the locking element which engages in one of the locking locators can preferably protrude beyond the outer end of the guide channel.

The locking strip can preferably be inserted radially into the longitudinal slot of the shaft, or, if the longitudinal slot can be open on an axial edge, the strip can also be inserted axially. The locking strip can essentially contain the spring-loaded locking elements. At least when all the guide wheels, or print wheels, have been mounted on the shaft, which shaft is fixed to the housing, the locking strip can then preferably be secured against moving radially out of the longitudinal slot in the shaft. As described in greater detail below, this safety measure can also be provided in another manner before the mounting of the guide or print wheels.

Because the locking elements in accordance with the present invention do not need to be inserted into the guide channel by means of elastic deformation, but instead can be put into guide channel via the inside end without essentially any deformation at all, and because the outer constriction of the guide channels can be made with certainty, it can essentially be ensured that each locking element extends outward from the constriction by precisely the specified amount. As a result, the depth of engagement of each snap-in lock into a locking locator can essentially always be the same, thereby resulting in the precise rotational orientation, free of play, of each guide wheel, or print wheel, for every possible setting. This also makes possible a precise row of aligned print symbols.

A refinement of this printing mechanism can preferably be provided by configuring the guide channels in the locking strip to be of a size which is large enough to house a spring of the necessary strength. Such a spring can be a common coil compression spring, wherein one end of the spring can abut a surface of the guide channel, while the other end can outwardly bias the locking element within the guide channel. Furthermore, the assembly process is essentially relatively simple.

A further embodiment of the invention provides that the side walls of the locking strip and the side walls of the longitudinal groove be disposed substantially parallel to one another. This can essentially make it possible to insert the locking strip with as little play as possible into the longitudinal groove. The assembly can even be further simplified if there are appropriate bevels on the edge of the longitudinal groove and/or on the inside end of the locking strip. The groove cross-section selected can essentially eliminate any notch stresses.

It is of particular advantage for the end surface of the locking strip to have a circular arc cross-section, whereby the radius of the end surface can preferably correspond to the radius of the shaft which is fixed to the housing. Thus, when the strip is inserted to the proper depth within the shaft groove, the end surface of the locking strip can essentially complete the cylinder shell, and can thus complete the shaft journal for the print wheels or guide wheels.

The proper depth of insertion of the locking strip into the shaft groove can essentially be guaranteed by means of an embodiment in which the outside of the locking strip has wedge-like shoulders, while the inside of the groove has corresponding recesses for receiving the shoulders therein. The locking thereby achieved between the locking strip and the shaft can thereby essentially prevent the pressure springs from forcing the locking strip out of the longitudinal groove in the shaft. In other words, the shaft and the locking strip with the spring-loaded locking elements essentially form a unit. By means of a suitable tool, the locking elements can, if necessary, be displaced radially inwardly into the groove while the guide wheels or print wheels are pushed onto the shaft, so that these wheels can be easily installed, i.e., placed on the shaft.

In a particularly advantageous configuration of the present invention, the shaft for the guide wheels can preferably be fabricated as a single piece with the housing. Alternatively, if the housing is formed by several housing parts, the shaft can be a single piece, or integral with one of the housing parts. The shaft can preferably be made of plastic, that is, the same material of the housing, and can preferably be formed together with the housing, or housing part, that is, during an injection molding of the housing. As a result, no installation work can typically be required for this shaft.

In a further embodiment of the present invention, it can be particularly advantageous if the housing is formed by two housing parts, one of which has the shaft extending therefrom, and the other of which has a corresponding recess for receiving the free end of the shaft therein. Such a configuration can essentially ensure both the centering and also the radial fixing of the free axial end of the shaft, which shaft on the other end is preferably molded to and fixed to the housing. This centering and radial fixing enables this shaft to be able to safely withstand a lateral load from the print-area side guide wheels, or a corresponding load from the drive wheels or print wheels. When printing belts are used, this centering and fixing can essentially prevent the belts from sagging or, in other words, can ensure proper tension of the printing belts.

The above features of the present invention will be discussed in more detail herebelow with reference to the accompanying figures. It should be understood that when the word "invention" is used in this application, the word "invention" includes "inventions", that is, the plural of "invention". By stating "invention", Applicants do not in any way admit that the present application does not include more than one patentably and non-obviously distinct invention, and maintains the possibility that this application may include more than one patentably and non-obviously distinct invention. The Applicants hereby assert that the disclosure of this application may include more than one invention, and, in the event that there is more than one invention, that these inventions may be patentable and non-obvious, one with respect to the other.

One aspect of the invention resides broadly in a hand-held, portable labelling device for printing labels, the labelling device comprising: a first housing; handle apparatus for gripping the labelling device in a hand; printing apparatus disposed within the first housing for printing on a label to produce a printed label, the printing apparatus being movable in a direction towards and away from the label; apparatus for actuating the printing apparatus to move the printing apparatus towards and away from the label; apparatus for providing ink to the printing apparatus; apparatus for supplying labels; apparatus for feeding labels from the label supply apparatus to the printing apparatus; the printing apparatus comprising: a second housing; shaft apparatus disposed within the second housing, the shaft apparatus defining a longitudinal dimension, and the shaft apparatus comprising a peripheral surface, and a groove disposed along at least a portion of the longitudinal dimension of the shaft apparatus; at least one wheel rotationally disposed about the shaft apparatus, the at least one wheel comprising an interior portion disposed adjacent the shaft apparatus, a periphery portion disposed away from the shaft apparatus, and print-type disposed about at least a portion of the periphery portion, the at least one wheel defining an axis of rotation, and the interior portion of the at least one wheel comprising at least one indentation; and apparatus for selectively fixing and selectively releasing the at least one wheel in an and from a rotationally fixed position on the shaft apparatus to locate at least one print-type in a position for printing of the at least one print-type on the label by the printing apparatus; and the apparatus for selectively fixing comprising a first member for being disposed within the groove of the shaft apparatus, the first member comprising:

a portion for being disposed within the groove of the shaft apparatus and a periphery portion disposed adjacent the periphery surface of the shaft apparatus; at least one passage disposed through the first member in a direction from the periphery portion through the first portion; apparatus for engaging the at least one indentation of the at least one wheel, the apparatus for engaging having a first portion disposed and guided within the at least one passage and a second portion extending out of the at least one passage through the periphery portion of the first member, the second portion being configured for engaging the at least one indentation to rotationally fix the at least one wheel on the shaft apparatus; and apparatus for biasing the second portion of the apparatus for engaging out of the at least one passage and into engagement with the at least one indentation.

Another aspect of the invention resides broadly in a method for assembling a hand-held, portable printing device, the printing device comprising: a first housing; handle apparatus for gripping the printing device in a hand; printing apparatus disposed within the first housing for printing on a label to produce a printed label, the printing apparatus being movable in a direction towards and away from the label; apparatus for actuating the printing apparatus to move the printing apparatus towards and away from the label; apparatus for providing ink to the printing apparatus; apparatus for supplying labels; apparatus for feeding labels from the label supply apparatus to the printing apparatus; the printing apparatus comprising: a second housing; shaft apparatus disposed within the second housing, the shaft apparatus defining a longitudinal dimension, and the shaft apparatus comprising a peripheral surface, and a groove disposed along at least a portion of the longitudinal dimension of the shaft apparatus; at least one wheel rotationally disposed about the shaft apparatus, the at least one wheel comprising an interior portion disposed adjacent the shaft apparatus, a periphery portion disposed away from the shaft apparatus, and print-type disposed about at least a portion of the periphery portion, the at least one wheel defining an axis of rotation, and the interior portion of the at least one wheel comprising at least one indentation; and apparatus for selectively fixing the at least one wheel in a rotationally fixed position on the shaft apparatus to locate at least one print-type in a position for printing of the at least one print-type on the label by the printing apparatus; and the apparatus for selectively fixing comprising a first member for being disposed within the groove of the shaft apparatus, the first member comprising: a portion for being disposed within the groove of the shaft apparatus and a periphery portion disposed adjacent the periphery surface of the shaft apparatus; at least one passage disposed through the first member in a direction from the periphery portion through the first portion; apparatus for engaging the at least one indentation of the at least one wheel, the apparatus for engaging having a first portion disposed and guided within the at least one passage and a second portion extending out of the at least one passage through the periphery portion of the first member, the second portion being configured for engaging the at least one indentation to rotationally fix the at least one wheel on the shaft apparatus; and apparatus for biasing the second portion of the apparatus for engaging out of the at least one passage and into engagement with the at least one indentation, the method comprising: providing the first housing; providing the handle apparatus on the first housing for gripping the first housing; providing the apparatus for actuating the printing apparatus to move the printing apparatus towards and away from the label; providing the apparatus for providing ink to the printing apparatus; providing the apparatus for supplying labels; providing the apparatus for feeding labels from the label supply apparatus to the printing apparatus; providing the printing apparatus within the first housing, the providing of the printing apparatus comprising: providing the second housing; providing the shaft apparatus having the groove, within the second housing; and providing the apparatus for fixing the at least one wheel in a rotationally fixed position on the shaft apparatus, the providing the apparatus for fixing comprising: providing the first member for being disposed within the groove of the shaft apparatus; providing the apparatus for engaging the at least one indentation of the at least one wheel; inserting the apparatus for engaging into the at least one passage of the first member; providing the apparatus for biasing the second portion of the apparatus for engaging out of the at least one passage; inserting the apparatus for biasing into the at least one passage; and inserting the first member, with the apparatus for engaging and the biasing apparatus disposed within the at least one passage, into the groove of the shaft apparatus; providing the at least one wheel for being disposed about the shaft apparatus; installing the at least one wheel about the shaft apparatus; and providing print-type disposed about at least a portion of the periphery portion of the at least one wheel.

BRIEF DESCRIPTION OF THE DRAWINGS

The embodiments of the present invention are described in greater detail herebelow with reference to the accompanying drawings, in which.

DESCRIPTION OF THE PREFERRED EMBODIMENTS

Figure 1A:
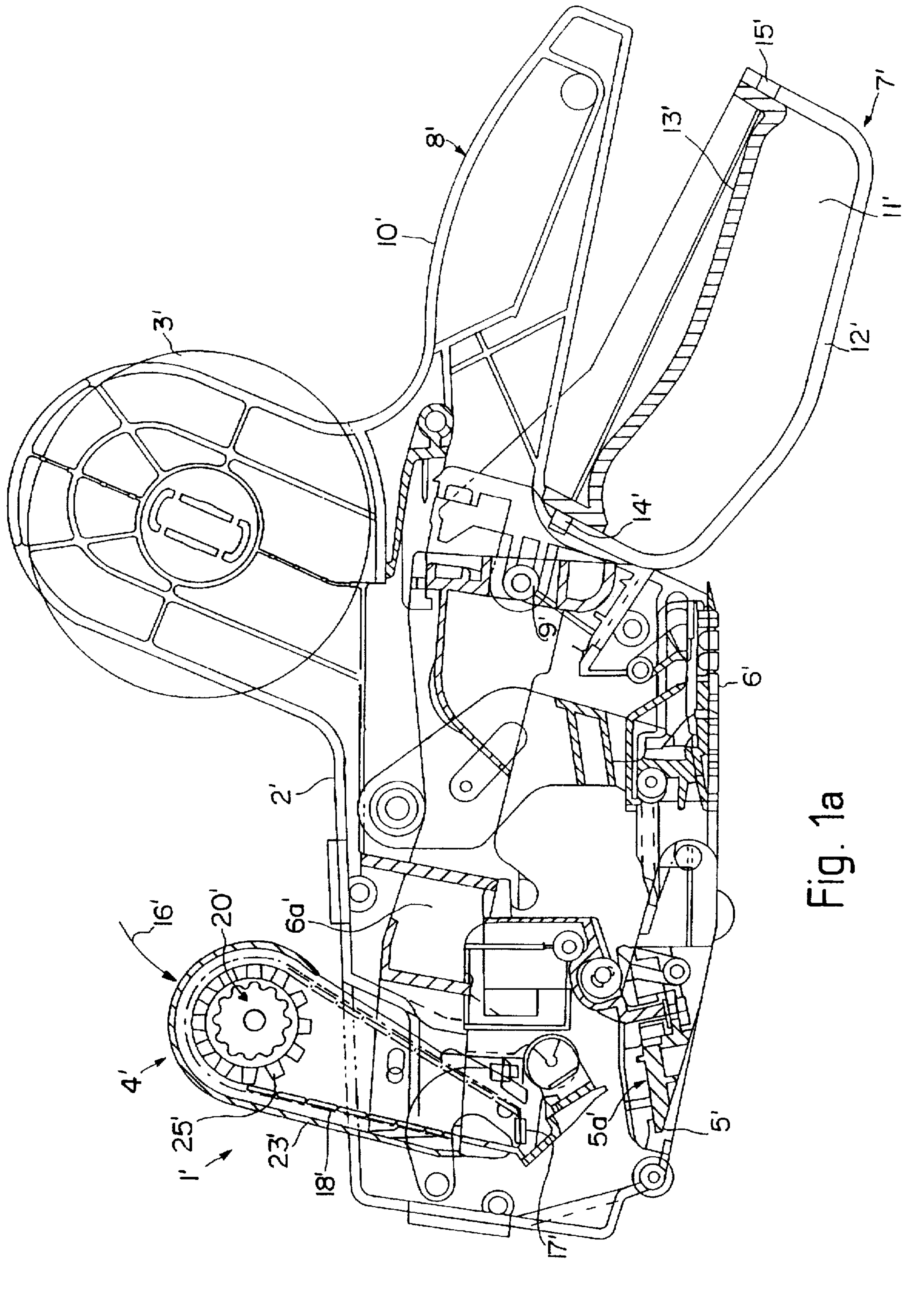
FIG. 1*a* shows a cross sectional view through a hand-held labelling device.

FIG. 1*a* shows a hand-held labelling unit 1') with a printing mechanism 4'. Such a hand-held labelling unit 1' can essentially be used to print labels or similar media which are supplied on a carrier or backing strip. Such a labelling unit 1' can preferably have a housing 2'. A label feed roll supplying the labels on the backing strip, as a whole, is designated 3', and can be located in the upper portion of the housing 2'. Following the printing and feeding inside the unit 1', as necessary, the labels can preferably be applied in a known manner to products or product packages. The carrier strip with the labels or similar media can preferably be transported through the unit in a known manner. The strip with the labels can be transported until it arrives underneath the printing mechanism 4', illustrated in more detail in FIG. 1, at a printing surface 5*a*', from which printing surface 5*a*', the carrier strip can be transported to a dispensing edge 5', where the label can be detached from the backing strip. A known transport device 6' can be provided to transport the labels through the hand-held labelling unit, whereby the printing mechanism 4' and the transport device 6' can both preferably be advanced by means of a hand lever 7'.

FIG. 1*a* shows the initial or idle position of the hand lever 7', which position is assumed by the lever 7' under the action of a built-in spring (not shown). When the hand lever 7' is pivoted around a bearing 9', i.e. counterclockwise or toward a hand grip 8', both the printing mechanism 4' and the transport device 6' are driven. For activating the printing mechanism 4', the hand lever 7' can be connected to the printing mechanism 4' by means of a pivot arm 7*a*', which lever arm 7*a*' pivots in the direction 16' during an actuation of the hand lever 7'. For activation, the fingers of the operating hand can preferably extend into an opening 11' of the hand lever 7', and the hand itself can be supported on an upper side 10' of the hand grip 8', which hand grip 8' is preferably solidly attached to the unit, i.e., molded thereto as one integral piece. In the depicted embodiment, the opening 11' is formed by a handle shell 12' of the hand lever 7' and a handle part 13' mounted so that it can pivot in bearings 14', 15'. This floating mounting, or support, of the handle part 13' on the hand lever 7' can be particularly advantageous for long work with the hand-held labelling unit 1', and can also provide protection for the hand.

When the hand lever 7' is pulled up toward the hand grip 8', the printing mechanism 4' preferably pivots in the direction indicated by the arrow 16', towards the surface 5*a*' whereupon lower type symbols 17', located in the work position, can be pressed onto a label disposed on surface 5*a*', and the impression of these symbols 17' can thus be made on the corresponding label. During a corresponding return of the handle lever 7' into its rest position, the labels can then be advanced, to the edge 5', from which edge 5' the printed labels can preferably be placed directly onto an item to be labelled. Alternatively, if a printing surface 5*a*' was not present, the impression of symbols 17' could be printed directly on an article.

At substantially equal intervals on the outside circumference of each belt 18' of the belt printing mechanism 4' there are preferably print symbols, e.g. numbers, letters, and any other symbols, including small groups of symbols. The belts 18', in serial numbering devices could also be preferably advanced in steps by means of an advancing mechanism (not shown here), unless the advancing mechanism has been deactivated. The setting of each belt 18' with respect to its neighboring belts can preferably be achieved by means of a control shaft 20', which control shaft 20') can preferably be pulled out or pushed in, in steps, in a direction substantially into and out of the plane of the figure, whereby each step preferably corresponds to the width of one belt 18'. Thus, in each extraction position, the control shaft 20' can be turned, to engage teeth 25' with corresponding teeth of a coupled belt 18' to thereby rotate the correspondingly coupled belt 18' clockwise or counterclockwise, and thereby controlling the character or symbol 17' to be printed. Instead of a belt printing mechanism 4', a wheel printing mechanism can also be used, in which case, the symbols 17' are not located on the outside of a belt 18', but instead on the circumference of a wheel.

The printing mechanism 4' can preferably be enclosed by some sort of housing member 23', which housing member 23' can substantially enclose and protect essentially all of the parts of the printing device 4'.

Figure 1:
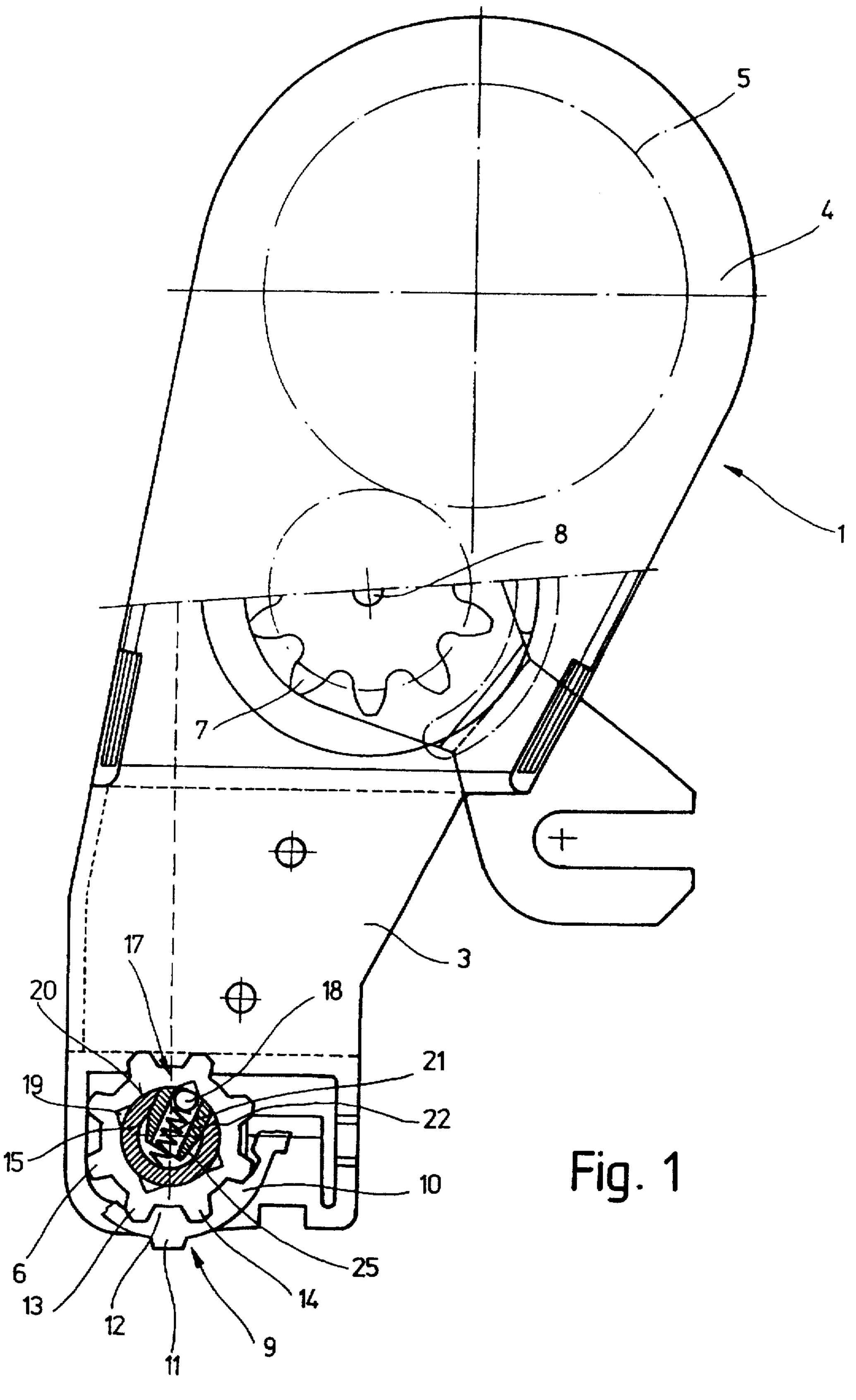
FIG. 1 shows a side view of a printing mechanism with printing belts, with the bottom half of the housing partly removed.

FIG. 1 shows an enlarged view of a printing mechanism such as the printing mechanism 4' of FIG. 1*a*. The exemplified embodiment shows a printing mechanism with printing belts, while as discussed above, print wheels could also be provided. The printing mechanism preferably has a housing 1, which can be longitudinally divided at approximately mid-plane 2 (see FIG. 3) so that there can preferably be a first housing part 3 and a second housing part 4. Each printing belt 10 can preferably be passed over a top guide wheel 5 (shown schematically), preferably realized as a toothed wheel, and a bottom guide wheel 6 on the print-area side of the mechanism. On the print-area side, bottom guide wheel 6 can likewise preferably be a toothed wheel. As a consequence, each printing belt 10 can then preferably be configured, on the inside, as a toothed belt while having print symbols on its outside. The symbols can create the impression on a print medium, for example, a label, etc., if the printing mechanism is pressed against the label. Alternatively, as discussed above, the device could be configured to print directly on an item which is to be marked, or labelled.

To set the print symbols, each top guide wheel 5 can be caused to rotate, in a known manner, by means of a pinion 7, whereby the pinion 7 can preferably be mounted in such a manner that it can be moved in stages inside the housing 1, in a direction perpendicular to the plane of the drawing. The stages can preferably correspond to the thickness or width of the guide wheels 5 or 6. The pinion 7 can be non-rotationally coupled to an adjustment shaft 8, which shaft 8, on the end which extends from the housing 1, can have a pull-and-turn knob (not shown here). The respective top guide wheel 5 can be acted upon in essentially any axial displacement position. The rotation of the pinion 7, and thus the resultant opposite rotation of the top guide wheel 5, are transmitted by the associated printing belt 10, shown in partial view in FIG. 1, to the print-area side guide wheel 6 in the same plane as the activated top guide wheel 5. In this manner, a precise position of a specified print symbol of the currently connected printing belt 10 can be moved to a print area 9.

FIG. 1 shows, in a cut-away view, a segment of the bottom end of the printing belt 10, which end is disposed about the guide wheel 6. FIG. 1 shows the typographic symbol 11 currently in position to print and the opposing tooth 12 of the toothed belt 10. This opposing tooth 12 is engaged in the space between the neighboring teeth 13 and 14 of the guide wheel 6 on the print-area side, thus resulting in a positive interlocking rotational drive, or rotational synchronization between the guide wheel 6 and the belt 10.

Figure 2:
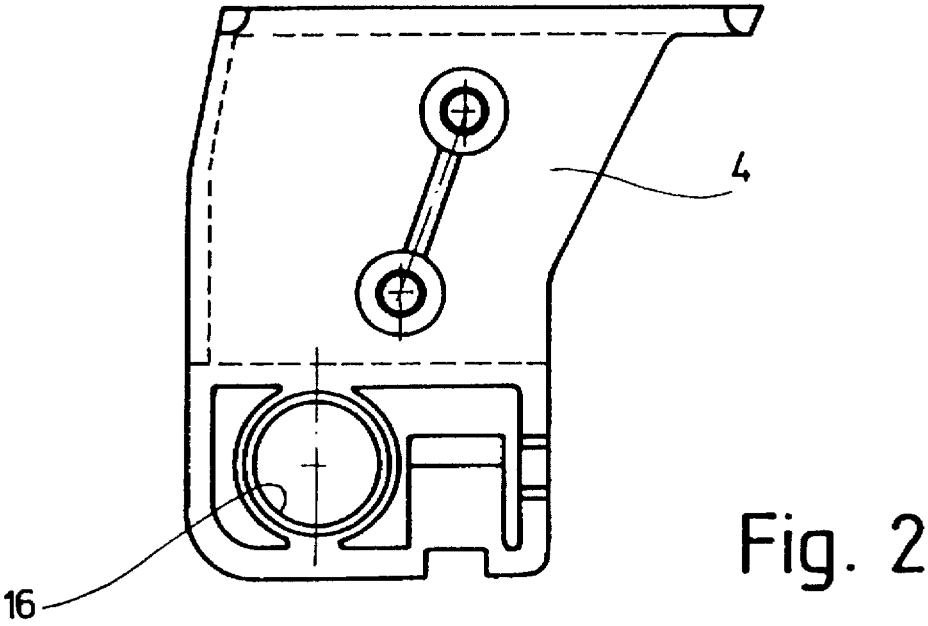
FIG. 2 shows, on a somewhat smaller scale, a broken sectional view of the inside of the lower half of the housing shown in FIG. 1.
Figure 3:
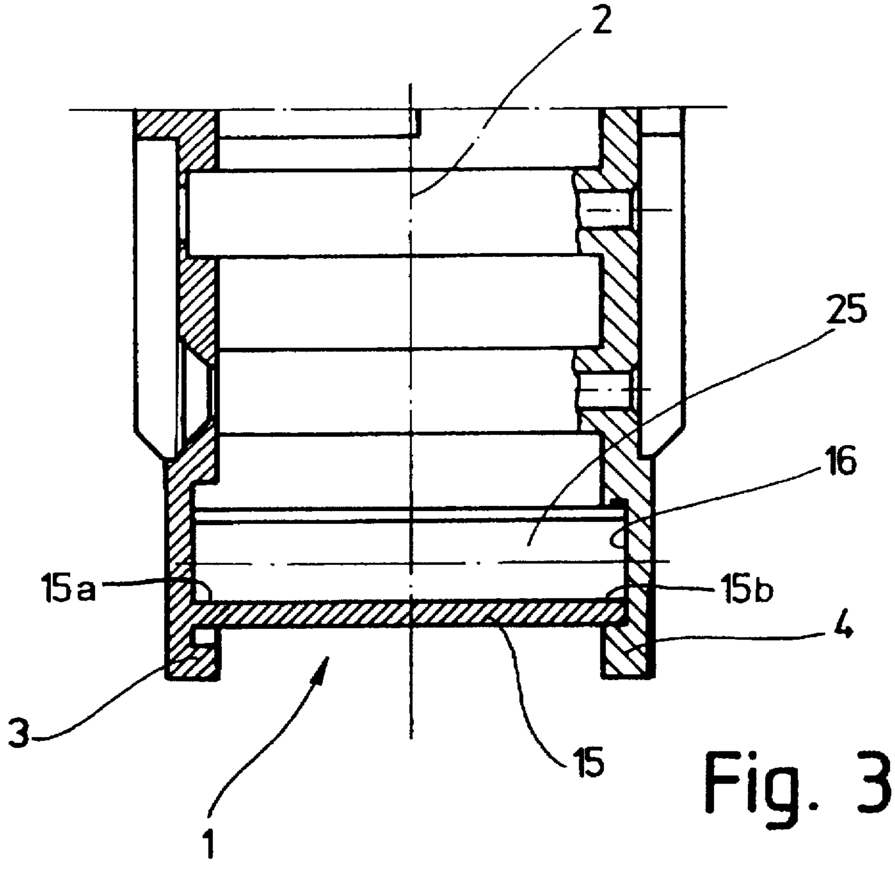
FIG. 3 shows a longitudinal section through the lower end of the housing, but without the print-area side guide wheels or the printing belts.

All guide wheels 6 on the print-area side can preferably be rotationally mounted on a shaft 15, which shaft 15 can preferably be fixed to the housing 1 at a first end 15*a* thereof (see FIG. 3). In this exemplified embodiment of FIG. 3, the shaft 15 can preferably be manufactured as a single piece with the first part 3 of the housing. The shaft 15 preferably extends laterally through the housing 1, whereby a free end 15*b* of the shaft 15 can be engaged in a blind recess 16 of the other, i.e., second part 4 of the housing, as shown in FIG. 2. The recess 16 preferably corresponds to the cross-section of the shaft 15 with minimal to no play. The result is that the shaft 15 can be supported on both ends 15*a* and 15*b*, thereby providing a sufficient support against lateral deformations of the shaft 15 by a printing force applied to the shaft 15, or a force applied by one of the belts 10.

As shown in FIG. 1, a locking mechanism 17 can preferably ensure that the print-area side guide wheels 6 can assume stable, precisely specified rotational positions on the shaft 15. In the embodiment shown in FIG. 1, there are four such defined positions, at intervals of about 90 degrees from one another, as defined by locking locators 19. The locking locators 19 can essentially be notches disposed in a bearing surface 20, which bearing surface 20 forms the interior of the guide wheels 6.

The locking mechanism 17 is preferably formed by one locking element 18 for each guide wheel 6, as well as a number of locking locators 19 about the bearing hole 20 of each guide wheel 6. The locking element 18 can be disposed in a channel 22 (shown in greater detail in FIG. 5, and can essentially be engaged in any desired locking locator 19, of which there are four in the depicted embodiment. The locking element 18 can preferably be spring-loaded toward the outside by means of a biasing member, or pressure spring 21. Such a biasing member can preferably be a helical pressure spring.

The guide channel 22 can preferably be configured so that the locking element 18, which in this embodiment is in the shape of a ball, cannot fully leave its guide channel 22, but protrudes therefrom by the specified amount necessary to engage in one of the locking locators 19. In an alternative embodiment, the locking elements 18 could possibly be cylindrical in shape with a conical end protruding out of the channel 22. Alternatively, other shapes might be usable as well, and would be well within the skill of the artisan.

Figure 5:
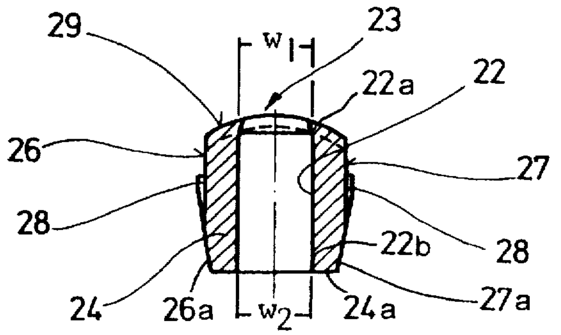
FIG. 5 shows a section along Line V—V in FIG. 4.

As seen in FIG. 5, the appropriate amount of protrusion can essentially be achieved by means of a taper 23 in the outer end 22a of the guide channel 22. Each guide channel 22 can preferably be realized in the form of a hole within a strip 24 (see also FIG. 4). The clearance width ($w_1$) of the taper 23 should preferably be less than the diameter of the ball to thereby prevent the ball from being ejected out of its guide channel 22. The ball should preferably, on the other hand have a diameter which is substantially the same as, or slightly less than, the width ($w_2$) of the passage 22. The ball, for the embodiment of FIG. 5, could essentially then be inserted into the guide channel 22 from below, or from the end 22b of the channel 22 opposite to the taper 23. The pressure spring 21 could then be installed in the guide channel 22 from the same end 22b. Thus, if the strip 24 was held with the end 22b facing upwardly, the ball and spring 21 would not fall out. The strip 24, after the ball and spring 21 are inserted therein, in an essentially upside down position of the strip 24 can then essentially be inserted into a groove 25 also while maintaining the upside down position so that the ball and spring 21 do not fall out.

In general, such a locking strip 24 can preferably be formed by an injection molding process wherein a mold can be provided with the necessary dimensions for the passage 22, etc., for ensuring that the locking elements 18 project the desired distance out of the passages 22. It has been found that it can essentially be easier to form a mold for such a strip with a tapered end 22a for the passage 22, than with a hook-shaped protrusion or a simple squared projection at the end 22a.

Figure 4:
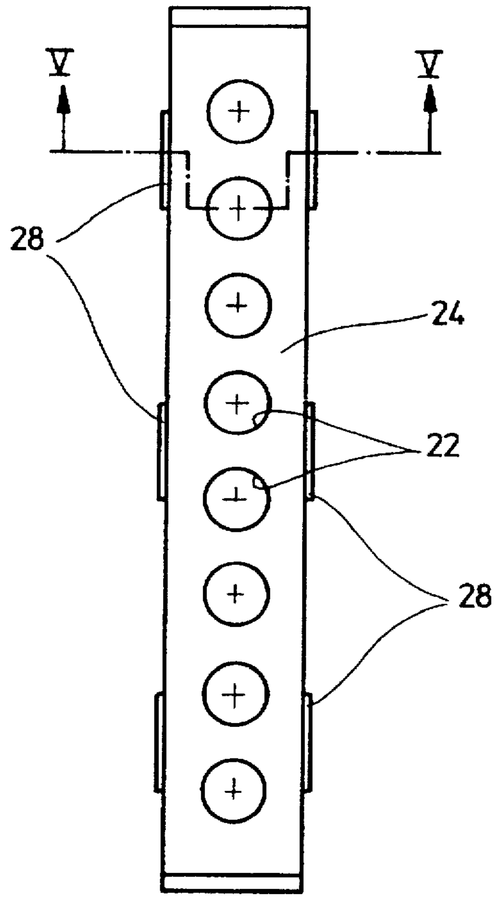
FIG. 4 shows a plan view in the vicinity of the outer surface of the locking strip.
Figure 6:
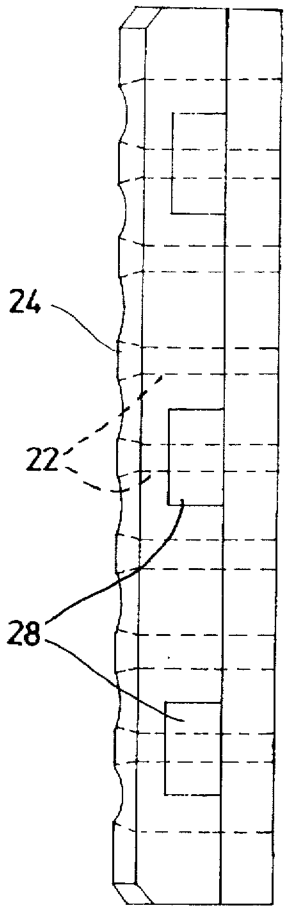
FIG. 6 shows a side elevational view of the locking strip of FIG. 4.

As shown in FIG. 4, and schematically in FIG. 6, the locking strip 24 can preferably be equipped with a series of guide channels 22, each of which preferably holds one locking element 18, not shown in FIGS. 4–6, and a pressure spring 21, also not shown in FIGS. 4–6. The distance between neighboring guide channels 22 should preferably correspond to the distance between the sides of the center planes of neighboring guide wheels 5 or 6, or in other words, approximately the thickness of one guide wheel 6, so that each locking element 18 can be disposed in the immediate path of the locking locators 19 of one of the guide wheels 6.

As shown in FIG. 1, the invention teaches that the shaft 15, which can be fixed to the housing 1, can be equipped with a longitudinal groove 25 for the insertion of the locking strip 24 therein. In this embodiment, the longitudinal groove 25 preferably has an approximately U-shaped cross-section with parallel groove walls. Accordingly, the side walls 26 and 27 of the locking strip 24 (see FIG. 5) can also preferably be parallel. With such a groove 25, the strip 24 could essentially be inserted substantially radially into the groove 25. To facilitate insertion of the locking strip 24 into the longitudinal groove 25 of the shaft 15, inner regions 26a and 27a of the side walls 26 and 27 can preferably be inclined slightly toward one another towards a bottom side 24a of the strip 24. In alternative embodiments, it could also be possible to insert the strip 24 axially into the groove 25, i.e. before the housing parts 3 and 4 are connected together. In such an embodiment, however, a guide tool would essentially be necessary to push the springs 21 into the passages 22 so that the spring edges would not catch on the end of the shaft 15 during the insertion. With a radial insertion, the strip 24 could preferably be inserted with the shaft 15 inverted or pointed downwardly, so that the ends 22b of the passages 22 were pointed essentially upwardly to keep the springs 21 and locking elements 18 from falling out of the passages 22. The springs 21 could then be automatically stressed when the strip 24 is pushed into place.

FIGS. 4 and 5 also show that the side walls 26 and 27 preferably support several, e.g. three, wedge-like locking shoulders 28. For each of these locking shoulders 28, there can preferably be corresponding locking grooves or notches in the walls of the groove 25. Alternatively, there could be one groove disposed along the length of each side of the groove 25. By means of the locking shoulders 28, the locking strip 24 can thus be locked into the longitudinal groove 25 in such a manner that the locking strip 24 essentially cannot be ejected radially out of the groove 25 under the force of the springs 21.

The wedge-like locking shoulders 28, which can be engaged in corresponding locking grooves or notches in the walls of the groove 25, can preferably be located in such a manner that, with the locking strip 24 inserted, a circular arc-shaped outer surface 29 of the strip 24 preferably completes the interrupted outer shell of the shaft 15, to form an essentially completely cylindrical shell having an essentially complete cylindrical surface, as shown in FIG. 1.

It will be apparent that a locking strip 24, of the same length as that depicted in FIGS. 4 and 6, can have a greater or lesser number of guide channels 22 than the one in the depicted embodiments of FIGS. 4 and 6, depending essentially on the number and thickness of the belts 10 and guide wheels 6. This can make it possible to use locking strips 24 which have fewer guide channels 22 with a greater distance between the channels, or which have more guide channels 22 with a smaller distance between the channels 22, in one and the same housing 1 for the printing mechanism. Thus, it is possible to accommodate wheel sets 6 with different numbers of wheels, such as a configuration with eight printing belts 10, as would be the case with the depicted embodiment. Thus, by simply replacing the strip 24, with a strip 24 having a different number of channels 22, and then placing a corresponding number of guide wheels 6 on the shaft 15, one can easily change the configuration of the printing mechanism thus making configurations with a higher or lower number of belts and/or wheels 6 can also be possible. As a result, the same housing 1 can essentially be used for a variety of label making devices, such as labelling devices commonly referred to as No. 22 or No. 26 devices, that is, a device for printing either 22 mm or 26 mm labels. In this manner, the universal use of the housing 1 and a whole series of printing elements becomes possible.

One feature of the invention resides broadly in the printing mechanism, in particular for labelling and marking devices, with multiple, coaxial print wheels or guide wheels 6 on the print-area side for printing belts 10, which wheels are rotationally mounted on a shaft 15 which is fixed to the housing and which can be locked into specified rotational positions by means of a locking mechanism 17, whereby in each specified position, the numbers, letters, symbols 11 etc. of all the print wheels or printing belts 10 form exactly one row and the locking mechanism 17 consists of a number of spring-loaded locking elements 18 corresponding to the number of print wheels or guide wheels 6, as well as several locking locators 19 for each locking element 18, characterized by the fact that the shaft 15 which is fixed to the housing is provided with a longitudinal groove 25 into which a locking strip 24 with the locking elements 18 is inserted, whereby for each locking element 18, the locking strip 24 has one guide channel 22 which is tapered at its outer end, beyond which the locking part of the locking element 18 which is inserted into one of the locking locators 19 protrudes.

Another feature of the invention resides broadly in the printing mechanism characterized by the fact that each locking element 18 is spring-loaded outwardly by means of a separate compression spring 21, in particular a coil compression spring, and the springs 21 rest with one end on the floor of the longitudinal groove 25 while the other end extends into the guide channel 22.

Yet another feature of the invention resides broadly in the printing mechanism characterized by the fact that the locking strip 24 has parallel side walls 26, 27 in at least its outer region and the longitudinal groove 25 has parallel groove walls in the vicinity of the locking strip 24 which walls make a continuous transition into the floor of the groove, which has a circular arc cross-section.

Still another feature of the invention resides broadly in the printing mechanism characterized by the fact that the end surface 29 of the locking strip 24 has a circular arc cross-section, whereby the radius of the locking strip corresponds to that of the shaft 15 which is fixed to the housing.

A further feature of the invention resides broadly in the printing mechanism characterized by wedge-like locking shoulders 28 on both parallel side walls 26, 27 of the locking strip 24, which shoulders are engaged in locking shoulders or similar structures of the two groove walls of the shaft 15.

Another feature of the invention resides broadly in the printing mechanism characterized by the fact that the locking elements 18 are balls and the guide channels 22 are holes with a circular cross-section.

Yet another feature of the invention resides broadly in the printing mechanism characterized by the fact that the shaft 15 which is fixed to the housing is fabricated as a single piece with the housing 1 or, in the event of a multi-part housing, is fixed to one of the parts of the housing 3, 4, and is preferably made of plastic.

Still another feature of the invention resides broadly in the printing mechanism characterized by the fact that the housing 1 is divided parallel to the plane of the wheels or printing belts and that the shaft 15 which is fixed to the housing is located on one part of the housing 3 while the other part of the housing 4 has a blind recess 16 for the free end of the shaft, into which recess the free end of the shaft is engaged with little radial play when the housing 1 is closed.

Some examples of portable, hand-held labelling devices and the components thereof, which could possibly be used in conjunction with the labelling device according to the present invention, might be or are disclosed by the following U.S. Pat. Nos. 5,258,090 to Becker and Volk, entitled "Hand-Held Portable Labelling Device and the Inking Roller Mounting Therefor"; 5,160,943 to Pettigrew et al., entitled "Printing System"; 4,853,068 to Werner Becker, entitled "Hand Labeling Device"; and 4,793,889 to Werner Becker, entitled "Hand Labeling Device"; all of which are assigned to the assignee of the present invention.

Other examples of portable, hand-held labelling devices and the components thereof, which could possibly be used in conjunction with the labelling device according to the present invention, might be or are disclosed by the following U.S. Pat. Nos. 5,254,206 to Donald Wing, entitled "Hand-Held Labeling Device"; 4,813,355 to Edward Stork, entitled "Hand-Held Printing and Labelling Device"; 4,704,185 to Richard Fischer, entitled "Hand-Held Dispenser and Applicator Apparatus for Dispensing Adhesive Labels, and the Like"; 4,690,723 to Paul Hamisch, entitled "Hand-Held Labeler"; 4,680,078 to Vanderpool and Bain, entitled "Hand-Held Labeler Having Improved Web Position Sensing and Print Head Control"; 4,668,326 to John Mistyurik, entitled "Hand-Held Labeler"; and 4,660,739 to Dooley and Bredeweg, entitled "Label Dispenser".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 08 460.9, filed on Mar. 12, 1994, having inventor Heinrich Volk, and DE-OS P 44 08 460.9 and DE-PS P 44 08 460.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A hand-held, portable labelling device for printing labels, said labelling device comprising:
   - a first housing;
   - handle means for gripping said labelling device in a hand;
   - printing means disposed within said first housing for printing on a label to produce a printed label, said printing means being movable in a direction towards and away from the label;

means for actuating said printing means to move said printing means towards and away from the label;
means for providing ink to said printing means;
means for supplying labels;
means for feeding labels from said label supply means to said printing means;
said printing means comprising:
a second housing;
shaft means disposed within said second housing, said shaft means defining a longitudinal dimension, and said shaft means comprising a peripheral surface, and a groove disposed along at least a portion of the longitudinal dimension of said shaft means;
at least one wheel rotationally disposed about said shaft means, said at least one wheel comprising an interior portion disposed adjacent said shaft means, a periphery portion disposed away from said shaft means, and print-type disposed about at least a portion of said periphery portion, said at least one wheel defining an axis of rotation, and said interior portion of said at least one wheel comprising at least one indentation; and
means for selectively fixing and selectively releasing said at least one wheel in and from a rotationally fixed position on said shaft means to locate at least one print-type in a position for printing of the at least one print-type on the label by said printing means; and said means for selectively fixing comprising a first member for being disposed within the groove of said shaft means, said first member comprising:
a portion for being disposed within said groove of said shaft means and a periphery portion disposed adjacent said periphery surface of said shaft means;
at least one passage disposed through said first member in a direction from said periphery portion through said first portion;
a strip-shaped member having a first side and a second side, said second side being spaced apart from said first side and substantially parallel to said first side;
means for engaging said at least one indentation of said at least one wheel, said means for engaging having a first portion disposed and guided within said at least one passage and a second portion extending out of said at least one passage through said periphery portion of said first member, said second portion being configured for engaging said at least one indentation to rotationally fix said at least one wheel on said shaft means; and
means for biasing said second portion of said means for engaging out of said at least one passage and into engagement with said at least one indentation;

said at least one passage comprising a plurality of passages in said strip-shaped member.

2. The labelling device according to claim 1, wherein:

said at least one passage has a longitudinal dimension and at least a first dimension taken substantially transverse to said longitudinal dimension;

said first portion of said means for engaging has a first dimension, said means for engaging being disposed within said at least one passage with said first dimension thereof substantially aligned with said first dimension of said at least one passage;

said first dimension of said at least one passage being greater than said first dimension of said first portion of said means for engaging over a substantial portion of the longitudinal dimension of said at least one passage to permit movement of said means for engaging along said substantial portion of the longitudinal dimension of said at least one passage; and said at least one passage has an opening in said peripheral portion of said first member, said first dimension of said at least one passage at said opening being less than said first dimension of said first portion of said means for engaging to prohibit passage of said first portion of said means for engaging through said opening of said at least one passage to maintain said means for engaging within said at least one passage.

3. The labelling device according to claim 2, wherein:

said groove of said shaft means has a base portion;

said biasing means comprises spring means disposed substantially within said at least one passage, said spring means having a first end contacting said first portion of said means for engaging, and a second end contacting said base portion of said groove means; and said spring means being prestressed between said first portion of said means for engaging and said base portion of said groove to bias said second portion of said means for engaging out said opening of said at least one passage into engagement with said at least one indentation of said at least one wheel means.

4. The labelling device according to claim 3, wherein:

said groove has a first side and a second side, said second side of said groove being spaced apart from and substantially parallel to said first side of said groove;

said first and second sides of said groove extend from said base of said groove to the outer peripheral portion thereof; and said base of said groove comprises an arc-shaped cross section extending from said first side of said groove to said second side of said groove, said base being concave with respect to said groove.

5. The labelling device according to claim 4, wherein:

said periphery portion of said first member has a peripheral surface, said peripheral surface of said first member having a radius of curvature;

said peripheral surface of said shaft means has a radius of curvature;

said radius of curvature of said peripheral surface of said first member is substantially the same as said radius of curvature of said peripheral surface of said shaft means; and said first member is disposed within said groove with said peripheral surface of said first member disposed in alignment with said peripheral surface of said shaft means to provide a substantially complete cylindrical surface about s&id shaft means.

6. The labelling device according to claim 5, wherein:

said first and second sides of said first member comprises projections extending therefrom;

said first and second sides of said groove comprise recesses; therein, said recesses corresponding to said projections of said first member; and said projections of said first member being configured and disposed to engage in and be retained within said recesses of said groove when said first member is disposed within said groove to retain said first member in said groove.

7. The labelling device according to claim 6, wherein:

said means for engaging comprise a ball, said ball having a peripheral surface, at least a portion of said peripheral surface of said ball comprising said second portion of said means for engaging;

said ball has a diameter, and comprises a portion defining said diameter, at least said portion defining said diameter comprises said first portion of said means for engaging;

said diameter of said ball being greater than said first dimension of said at least one passage at said opening of said at least one passage; and said diameter of said ball being less than said first dimension of said substantial portion of said at least one passage.

8. The labelling device according to claim 7, wherein:

said substantial portion of said at least one passage comprises a cylindrical bore through said first portion of said first member;

said peripheral portion of said at least one passage comprises a conical taper extending from said cylindrical bore to said opening of said at least one passage;

said first and second sides of said first member each have an end for being inserted into said groove;

said first end of at least one of said first and second sides of said first member comprises a tapered portion tapered away from the other of said at least one of said first and second sides in a direction away from said end for being inserted;

said groove has a width;

said first member has a first width between said first and second sides from said tapered portion of said at least one of said first and second ends to said peripheral surface thereof, and a second width at said ends for being inserted;

said first width of said first member being substantially the same as the width of the groove; and said second width of said first member, at said ends for being inserted, is less than said width of said groove to guide radial insertion of said first member into said groove.

9. The labelling device according to claim 8, wherein:

said shaft means comprises a substantially cylindrical shaft having a hollow interior, said cylindrical shaft comprising a wall defining said cylinder;

said groove means comprises a longitudinal opening in said wall of said shaft;

said cylindrical shaft comprises an integral part of at least a portion of said second housing;

said cylindrical shaft comprises a first end integrally formed with said at least a portion of said second housing and a second end opposite said first end;

said first housing additionally comprises at least one additional housing part disposed spaced apart from said at least a portion of said second housing; and said at least one additional housing part comprises a recess therein for receiving and supporting said second end of said cylindrical shaft therein.

10. The labelling device according to claim 9, wherein:

said housing and said shaft comprise plastic;

said second housing comprises a first housing half and a second housing half;

said first housing half comprises said cylindrical shaft as an integral portion thereof;

said second housing half comprises said recess for receiving and supporting said second end of said cylindrical shaft therein;

each of said plurality of passages comprising one said ball and spring means therein for biasing at least a portion of said ball out said opening of said peripheral surface of said first member;

said printing means further comprises a plurality of wheels disposed about said cylindrical shaft, with one said wheel corresponding to each said passage, each said wheel comprising at least one said indentation on the interior portion thereof;

said second housing comprises a first end disposed within said first housing and a second end disposed away from said first end;

said printing means further comprises:

second shaft means disposed at said first end of said second housing;

a plurality of first guide wheels disposed about said second shaft means, one of said first guide wheels corresponding to each of said wheels on said cylindrical shaft to form corresponding wheel pairs, said first guide wheels comprising first toothed wheels;

said wheels of said cylindrical shaft comprise second toothed wheels;

said cylindrical shaft disposed at said second end of said second housing;

belt means disposed about each corresponding wheel pair, each said belt means comprising a plurality of print-type thereon, said belt means having an internal surface, and said internal surface comprising toothing corresponding to said toothing of said first and second toothed wheels;

means for independently rotating ones of said plurality of first guide wheels to rotate said corresponding wheel of said cylindrical shaft to rotate said belt means and rotate said print-type of said belt means through said printing position;

said projections of said first and second sides of said first member comprise wedge-shaped projections, said wedge-shaped projections having a thickness away from said first and second sides, and said wedge-shaped projections increasing in thickness from said end for being inserted of said first and second sides toward said peripheral portion of said first member; and said spring means comprise coil springs.

11. A method for assembling a hand-held, portable printing device, the printing device comprising: a first housing; handle means for gripping the printing device in a hand; printing means disposed within the first housing for printing on a label to produce a printed label, the printing means being movable in a direction towards and away from the label; means for actuating the printing means to move the printing means towards and away from the label; means for providing ink to the printing means; means for supplying labels; means for feeding labels from the label supply means to the printing means; the printing means comprising: a second housing; shaft means disposed within the second housing, the shaft means defining a longitudinal dimension, and the shaft means comprising a peripheral surface, and a groove disposed along at least a portion of the longitudinal dimension of the shaft means; at least one wheel rotationally disposed about the shaft means, the at least one wheel comprising an interior portion disposed adjacent the shaft means, a periphery portion disposed away from the shaft means, and print-type disposed about at least a portion of the periphery portion, the at least one wheel defining an axis of rotation, and the interior portion of the at least one wheel comprising at least one indentation; and means for selectively fixing the at least one wheel in a rotationally fixed position on the shaft means to locate at least one print-type in a position for printing of the at least one print-type on the label by the printing means; and the means for selectively fixing comprising a first member for being disposed within the groove of the shaft means, the first member comprising: a portion for being disposed within the groove of the shaft means and a periphery portion disposed adjacent the periphery surface of the shaft means; at least one passage disposed through the first member in a direction from the periphery portion through the first portion; means for engaging the at least one indentation of the at least one wheel, the means for engaging having a first portion disposed and guided within the at least one passage and a second portion extending out of the at least one passage through the periphery portion of the first member, the second portion being configured for engaging the at least one indentation to rotationally fix the at least one wheel on the shaft means; and means for biasing the second portion of the means for engaging out of the at least one passage and into engagement with the at least one indentation, the method comprising:

- providing the first housing;
- providing the handle means on the first housing for gripping the first housing;
- providing the means for actuating the printing means to move the printing means towards and away from the label;
- providing the means for providing ink to the printing means;
- providing the means for supplying labels;
- providing the means for feeding labels from the label supply means to the printing means;
- providing the printing means within the first housing, the providing of the printing means comprising:
  - providing the second housing;
  - providing the shaft means having the groove, within the second housing; and
  - providing the means for fixing the at least one wheel in a rotationally fixed position on the shaft means, the providing the means for fixing comprising:
    - providing the first member for being disposed within the groove of the shaft means;
    - providing the means for engaging the at least one indentation of the at least one wheel;
    - inserting the means for engaging into the at least one passage of the first member;
    - providing the means for biasing the second portion of the means for engaging out of the at least one passage;
    - inserting the means for biasing into the at least one passage; and
    - inserting the first member, with the means for engaging and the biasing means disposed within the at least one passage, into the groove of the shaft means;
  - providing the at least one wheel for being disposed about the shaft means;
  - installing the at least one wheel about the shaft means; and
  - providing print-type disposed about at least a portion of the periphery portion of the at least one wheel;
- providing a strip-shaped member as the first member, the strip-shaped member having a first side and a second side, the second side being spaced apart from the first side and substantially parallel to the first side; and
- providing a plurality of passages in the strip-shaped member.

12. The method according to claim 11, wherein the at least one passage has a first opening at the first portion of the first member, a second opening at the peripheral portion of the first member, a longitudinal dimension and at least a first dimension taken substantially transverse to the longitudinal dimension, the first portion of the means for engaging has a first dimension, the first dimension of the at least one passage, at least at the first opening and along a substantial portion of the longitudinal dimension of the at least one passage, being greater than the first dimension of the first portion of the means for engaging, the first dimension of the at least one passage at the second opening being less than the first dimension of the first portion of the means for engaging, and said method further comprises:

- aligning the first dimension of the first portion of the means for engaging with the first dimension of the at least one passage;
- inserting the means for engaging into the at least one passage through the first opening of the at least one passage with the first dimension of the first portion of the means for engaging aligned with the first dimension of the at least one passage;
- moving the means for engaging along the substantial portion of the longitudinal dimension of the at least one passage towards the first opening of the at least one passage to pass the second portion of the means for engaging through the second opening;
- prohibiting passage of the first portion of the means for engaging through the opening of the at least one passage to maintain the means for engaging within the at least one passage adjacent the second opening of the at least one passage;
- maintaining the means for engaging within the at least one passage; and
- inserting the biasing means through the first opening of the at least one passage to contact the means for engaging.

13. The method according to claim 12, wherein the groove of the shaft means has a base portion and the biasing means comprises spring means having a first end and a second end, and said method further comprises:

- inserting the spring means through the first opening to contact the first end of the spring means with the first portion of the means for engaging;
- inserting the first portion of the first member into the groove to contact the second end of the spring means with the base portion of the groove; and
- during the inserting of the spring means compressing the spring means between the means for engaging and the base of the groove to bias the second portion of the means for engaging out the second opening of the passage.

14. The method according to claim 13, wherein the groove has a first side and a second side, the second side being spaced apart from and substantially parallel to the first side, the first and second sides of the grooves extend from the base of the groove to the outer peripheral portion of the shaft means, and said method further comprises:

- configuring the base of the groove as an arc-shaped cross section extending from the first side of the groove to the second side of the groove, the base being concave with respect to the groove.

15. The method according to claim 14, wherein the periphery portion of the first member has a peripheral surface, the peripheral surface of the first member has a radius of curvature, and the peripheral surface of the shaft means has a radius of curvature, and said method further comprises:

configuring the radius of curvature of the peripheral surface of the first member to be substantially the same as the radius of curvature of the peripheral surface of the shaft means; and inserting the first member into the groove to substantially align the peripheral surface of the first member with the peripheral surface of the shaft means to provide a substantially complete cylindrical surface about the shaft means.

16. The method according to claim 15, further including:

providing a number of projections extending from the first and second sides of the first member;

providing a corresponding number of recesses in the first and second sides of the groove;

inserting the first member into the groove to engage the projections of the first member in the recesses of the groove; and configuring the projections and recess to retain the projections within the recesses to retain the first member within the groove.

17. The method according to claim 16, wherein said method further comprises:

configuring the means for engaging as a ball for being disposed within each the at least one passages, the ball having a peripheral surface, at least a portion of the peripheral surface of the ball comprising the second portion of the means for engaging, the ball has a diameter, and comprises a portion defining the diameter, at least the portion defining the diameter comprises the first portion of the means for engaging;

configuring the diameter of the ball to be greater than the first dimension of the at least one passage at the opening of the at least one passage; and configuring the diameter of the ball to be less than the first dimension of the substantial portion of the at least one passage.

18. The method according to claim 17, wherein said method further comprises:

configuring the substantial portion of the at least one passage as a cylindrical bore through the first portion of the first member;

configuring peripheral portion of the at least one passage as a conical taper extending from the cylindrical bore to the opening of the at least one passage;

configuring the first and second sides of the first member to each have an end for being inserted into the groove;

configuring the first end of at least one of the first and second sides of the first member to comprise a tapered portion tapered away from the other of the at least one of the first and second sides in a direction away from the end for being inserted;

configuring the groove to have a width;

configuring the first member to have a first width between the first and second sides from the tapered portion of the at least one of the first and second ends to the peripheral surface thereof, and a second width at the ends for being inserted;

configuring the first width of the first member to be substantially the same as the width of the groove; and configuring the second width of the first member, at the ends for being inserted, to be less than the width of the groove to guide radial insertion of the first member into the groove.

19. The method according to claim 18, further including the steps of:

configuring the shaft means as a substantially cylindrical shaft having a hollow interior, the cylindrical shaft comprising a wall defining the cylinder;

configuring the groove means to comprise a longitudinal opening in the wall of the shaft;

configuring the cylindrical shaft as an integral part of at least a portion of the second housing;

configuring the cylindrical shaft to comprise a first end integrally formed with the at least a portion of the second housing, and a second end opposite the first end;

configuring the first housing to additionally comprise at least one additional housing part disposed spaced apart from the at least a portion of the second housing; and configuring the at least one additional housing part to comprise a recess therein for receiving and supporting the second end of the cylindrical shaft therein.

20. The method according to claim 19, further comprising the steps of:

constructing the housing and the shaft from plastic;

configuring the second housing as a first housing half and a second housing half;

configuring the first housing half to comprise the cylindrical shaft as an integral portion thereof;

configuring the second housing half to comprise the recess for receiving and supporting the second end of the cylindrical shaft therein;

inserting into each passage one ball, and spring means for biasing at least a portion of the ball out of the opening of the peripheral surface of the first member;

disposing a plurality of wheels about the cylindrical shaft, with one of said wheels corresponding to each passage, each wheel comprising at least one indentation on the interior portion thereof;

configuring the second housing to comprise a first end disposed within the first housing and a second end disposed away from the first end;

providing second shaft means disposed at the first end of the second housing;

providing a plurality of first guide wheels disposed about the second shaft means, one of the first guide wheels corresponding to each of the wheels on the cylindrical shaft to form corresponding wheel pairs, the first guide wheels comprising first toothed wheels;

configuring the wheels of the cylindrical shaft to comprise second toothed wheels;

disposing the cylindrical shaft at the second end of the second housing;

disposing belt means about each corresponding wheel pair, each the belt means comprising a plurality of print-type thereon, the belt means having an internal surface, and the internal surface comprising toothing corresponding to the toothing of the first and second toothed wheels;

providing means for independently rotating ones of the plurality of first guide wheels to rotate the corresponding wheel of the cylindrical shaft to rotate the belt means and rotate the print-type of the belt means through the printing position;

configuring the projections of the first and second sides of the first member as wedge-shaped projections, the wedge-shaped projections having a thickness away from the first and second sides, and the wedge-shaped projections increasing in thickness from the end for being inserted of the first and second sides toward the peripheral portion of the first member; and configuring the spring means as coil springs.

* * * * *

UNITED STATES PATENT AND TRADEMARK OFFICE

CERTIFICATE OF CORRECTION

PATENT NO. : 5,639,340

DATED : June 17, 1997

INVENTOR(S) : Heinrich VOLK

It is certified that error appears in the above-identified patent and that said Letters Patent is hereby corrected as shown below:

In column 6, line 51, after 'unit', delete " 1') " and insert -- 1' --.

In column 7, line 48, after the second occurrence of 'shaft', delete " 20') " and insert -- 20' --.

In column 14, line 52, Claim 5, after 'about', delete "s&id" and insert --said--.

Signed and Sealed this

Seventh Day of October, 1997

Attest:

BRUCE LEHMAN

*Attesting Officer*

*Commissioner of Patents and Trademarks*